United States Patent
Mizoguchi

(10) Patent No.: US 10,024,418 B2
(45) Date of Patent: Jul. 17, 2018

(54) DIFFERENTIAL HOUSING

(71) Applicant: TOYOTA JIDOSHA KABUSHIKI KAISHA, Toyota-shi, Aichi-ken (JP)

(72) Inventor: Norihiro Mizoguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/714,388

(22) Filed: Sep. 25, 2017

(65) Prior Publication Data

US 2018/0106356 A1 Apr. 19, 2018

(30) Foreign Application Priority Data

Oct. 13, 2016 (JP) ................................. 2016-201800

(51) Int. Cl.
| | |
|---|---|
| *F16H 57/03* | (2012.01) |
| *F16H 48/08* | (2006.01) |
| *F16H 48/40* | (2012.01) |
| *F16H 57/021* | (2012.01) |
| *F16H 57/028* | (2012.01) |
| *F16H 57/032* | (2012.01) |
| *F16H 57/037* | (2012.01) |

(52) U.S. Cl.
CPC ............ *F16H 57/03* (2013.01); *F16H 48/08* (2013.01); *F16H 48/40* (2013.01); *F16H 57/021* (2013.01); *F16H 57/028* (2013.01); *F16H 57/032* (2013.01); *F16H 57/037* (2013.01); *F16H 2048/405* (2013.01)

(58) Field of Classification Search
CPC ...... F16H 57/03; F16H 57/037; F16H 27/032; F16H 57/028; F16H 48/40; F16H 48/08; F16H 57/021; F16H 2048/405
See application file for complete search history.

(56) References Cited

U.S. PATENT DOCUMENTS

| | | | | |
|---|---|---|---|---|
| 3,198,036 | A * | 8/1965 | Muller | F16H 48/06 475/246 |
| 4,543,853 | A * | 10/1985 | von Hiddessen | F16H 48/08 475/246 |
| 7,051,619 | B1 * | 5/2006 | Morgillo | B60K 17/16 180/344 |

(Continued)

FOREIGN PATENT DOCUMENTS

| | | |
|---|---|---|
| JP | H03-221257 A | 9/1991 |
| JP | 2007-71306 A | 3/2007 |

*Primary Examiner* — David J Hlavka
(74) *Attorney, Agent, or Firm* — Oliff PLC

(57) ABSTRACT

A differential housing is configured to support a plurality of bearings. The differential housing includes a first bearing surrounding member provided to surround a first bearing included in the plurality of bearings. The differential housing includes a second bearing surrounding member provided to surround a second bearing included in the plurality of bearings; and a connecting member that connects the first bearing surrounding member and the second bearing surrounding member, at least a part of the connecting member being embedded in a wall that is made of a base material of the differential housing. Each of the first bearing surrounding member, the second bearing surrounding member, and the connecting member is constructed of a material having a smaller linear expansion coefficient than that of the base material of the differential housing.

6 Claims, 4 Drawing Sheets

(56) References Cited

U.S. PATENT DOCUMENTS

2007/0093348 A1\* 4/2007 Demirdogen .......... F16H 48/08
　　　　　　　　　　　　　　　　　　　　475/230
2014/0128192 A1\* 5/2014 Korenaga ................ F16H 1/32
　　　　　　　　　　　　　　　　　　　　475/5

\* cited by examiner

DIFFERENTIAL HOUSING

INCORPORATION BY REFERENCE

The disclosure of Japanese Patent Application No. 2016-201800 filed on Oct. 13, 2016 including the specification, drawings and abstract is incorporated herein by reference in its entirety.

BACKGROUND

1. Technical Field

The disclosure relates to a differential housing that accommodates and supports a final reduction gear mechanism and a differential gear mechanism.

2. Description of Related Art

In a differential that includes a differential housing that accommodates and supports a final reduction gear mechanism and a differential gear mechanism, when a dimensional change occurs due to a temperature change, that is, thermal expansion/contraction occurs, a relative positional relationship among support points of gears accommodated in the differential housing is changed, and as a result, noise and vibrations may be caused in the gears. Thus, a power transmission state may fluctuate.

For example, Japanese Unexamined Patent Application Publication No. 03-221257 (JP 03-221257 A) describes a configuration in which a tubular member having a smaller linear expansion coefficient than that of a base material of a differential housing is inserted in a part of an inner surface of the differential housing by insert casting. With the configuration, the thermal expansion/contraction of the differential housing can be suppressed, as compared to a case where an entire structure of the differential housing is made of a material having a large linear expansion coefficient.

SUMMARY

In JP 03-221257 A, no attention is paid to a change in a relative positional relationship among input bearings and two differential case bearings, and to a change in a relative positional relationship between the two differential case bearings. The input bearings support a rotational shaft of a drive pinion gear as an input gear. The two differential case bearings support ends of a differential case. In addition, because the tubular member having the small linear expansion coefficient is inserted in the inner surface of the differential housing by casting, the tubular member is likely to be displaced with respect to the base material due to the thermal expansion/contraction. This causes the change in the relative positional relationship among the input bearings and the differential case bearings. Thus, improvement is still required to effectively suppress a fluctuation of the power transmission state.

The disclosure further effectively suppresses a fluctuation of a power transmission state due to thermal expansion/contraction of a differential housing.

An aspect of the disclosure relates to a differential housing configured to support a plurality of bearings including an input bearing and a pair of right and left differential case bearings. The input bearing supports a rotational shaft of an input gear meshing with a gear. The right and left differential case bearings support a differential case such that the differential case is rotatable. The gear meshing with the input gear is fixed to the differential case. The differential housing includes a first bearing surrounding member provided to surround a first bearing included in the plurality of bearings; a second bearing surrounding member provided to surround a second bearing included in the plurality of bearings; and a connecting member that connects the first bearing surrounding member and the second bearing surrounding member, at least a part of the connecting member being embedded in a wall that is made of a base material of the differential housing. Each of the first bearing surrounding member, the second bearing surrounding member, and the connecting member is constructed of a material having a smaller linear expansion coefficient than that of the base material of the differential housing.

In the above aspect of the disclosure, at least a part of the connecting member is embedded in the wall that is made of the base material of the differential housing. Thus, when thermal expansion/contraction occurs in the differential housing, it is possible to suppress a change in a relative positional relationship among the input bearing that supports the rotational shaft of the input gear, and the right and left differential case bearings that support the differential case, and/or a change in a relative positional relationship between the right and left differential case bearings. Thus, it is possible to suppress a change in a relative positional relationship between the input gear and the gear meshing with the input gear. As a result, it is possible to suppress a fluctuation of a power transmission state due to thermal expansion/contraction of the differential housing. In addition, because at least a part of the connecting member is embedded in the wall that is made of the base material of the differential housing, it is possible to suppress displacement of the connecting member with respect to the base material during the thermal expansion/contraction.

In the differential housing according to the aspect, the connecting member may include at least one projection that projects in a direction crossing a longitudinal direction of the connecting member.

In the above configuration, thermal stress generated by the thermal expansion/contraction of the differential housing is distributed and applied to each attachment position at which the projection is attached. Thus, deformation of the connecting member can be suppressed. In addition, because the at least one projection of the connecting member functions to resist against the thermal expansion/contraction of the differential housing, the thermal expansion/contraction of the differential housing can be suppressed.

In the differential housing according to the aspect, the first bearing may be the input bearing, and the second bearing may be at least one of the differential case bearings.

In the above configuration, it is possible to suppress a change in a relative positional relationship between the input bearing and the at least one differential case bearing.

In the differential housing according to the aspect, the first bearing may be one of the right and left differential case bearings, and the second bearing may be the other of the right and left differential case bearings.

In the above configuration, a change in a relative positional relationship between the two differential case bearings can be suppressed.

In the differential housing according to the aspect, the input bearing may include a first input bearing and a second input bearing that is disposed to be more distal than the first input bearing; and the first bearing may be the first input bearing, and the second bearing is the second input bearing.

In the above configuration, a change in a relative positional relationship between the two input bearings can be suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the disclosure will be described with reference the drawings.

In the disclosure, the word "surround" includes "completely surrounding a periphery of a member", and "incompletely surrounding the periphery of the member". For example, the meaning of the phrase "surround a bearing" includes a case where the bearing is surrounded by an annular member, and a case where the bearing is surrounded by a C-shaped member.

In addition, in the disclosure, a "rotational shaft of an input gear" indicates a drive pinion shaft used in a vehicle with a front-engine, rear-wheel-drive (FR) layout or the like, and a countershaft used in a vehicle with a front-engine, front-wheel-drive (FF) layout or the like.

Furthermore, in the disclosure, a "differential housing" indicates the differential housing used for the vehicle with the FR layout or the like, and a housing portion that accommodates a differential in the vehicle with the FF layout or the like.

Figure 1:
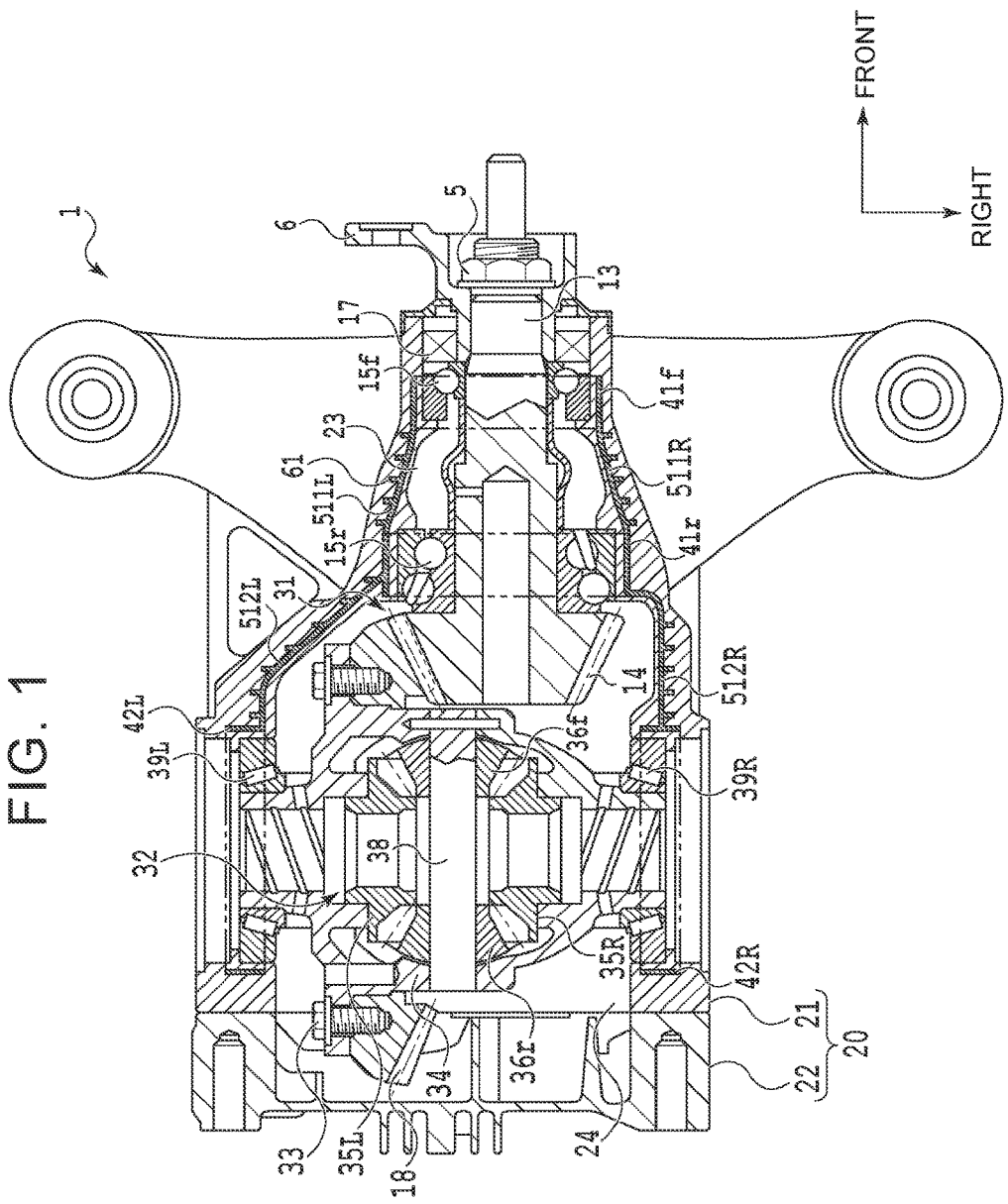
FIG. 1 is a plan sectional view of a differential that includes a differential housing according to an embodiment of the disclosure.
Figure 2:
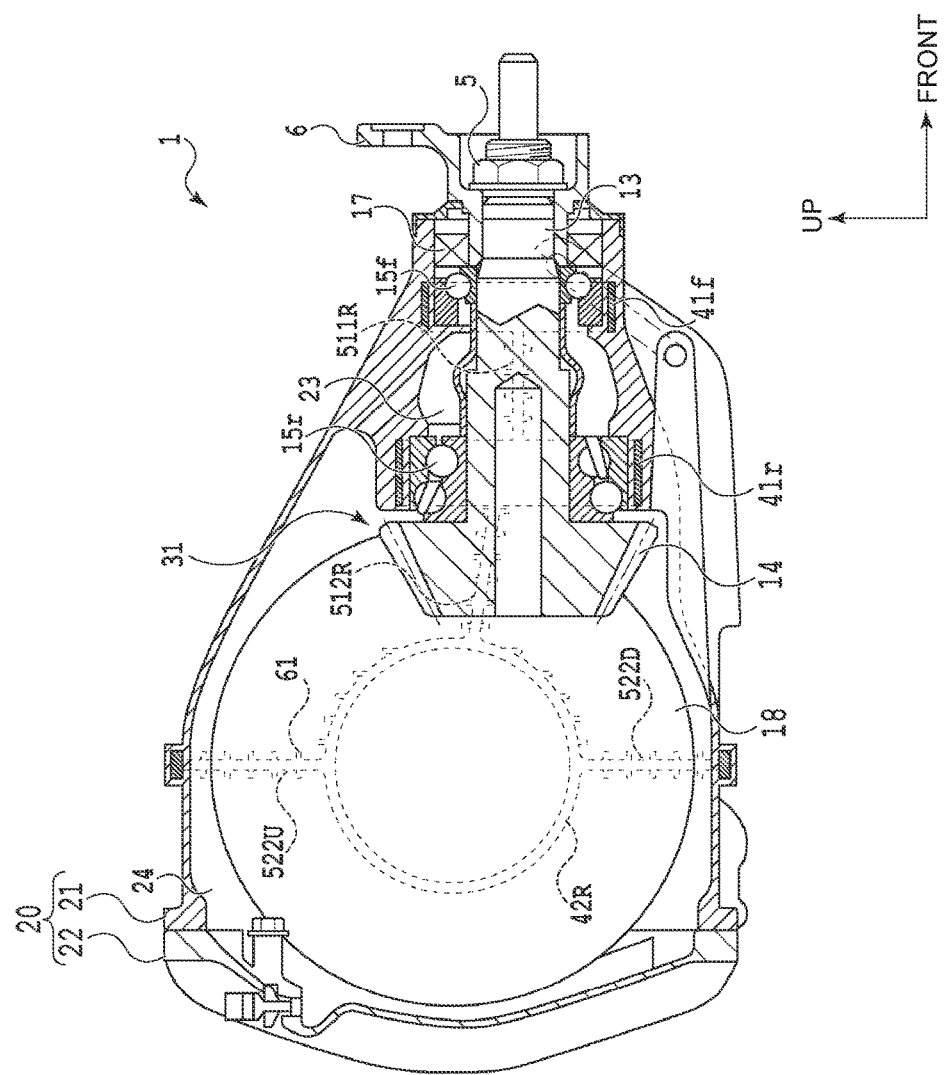
FIG. 2 is a side sectional view of the differential that includes the differential housing according to the embodiment.
Figure 3:
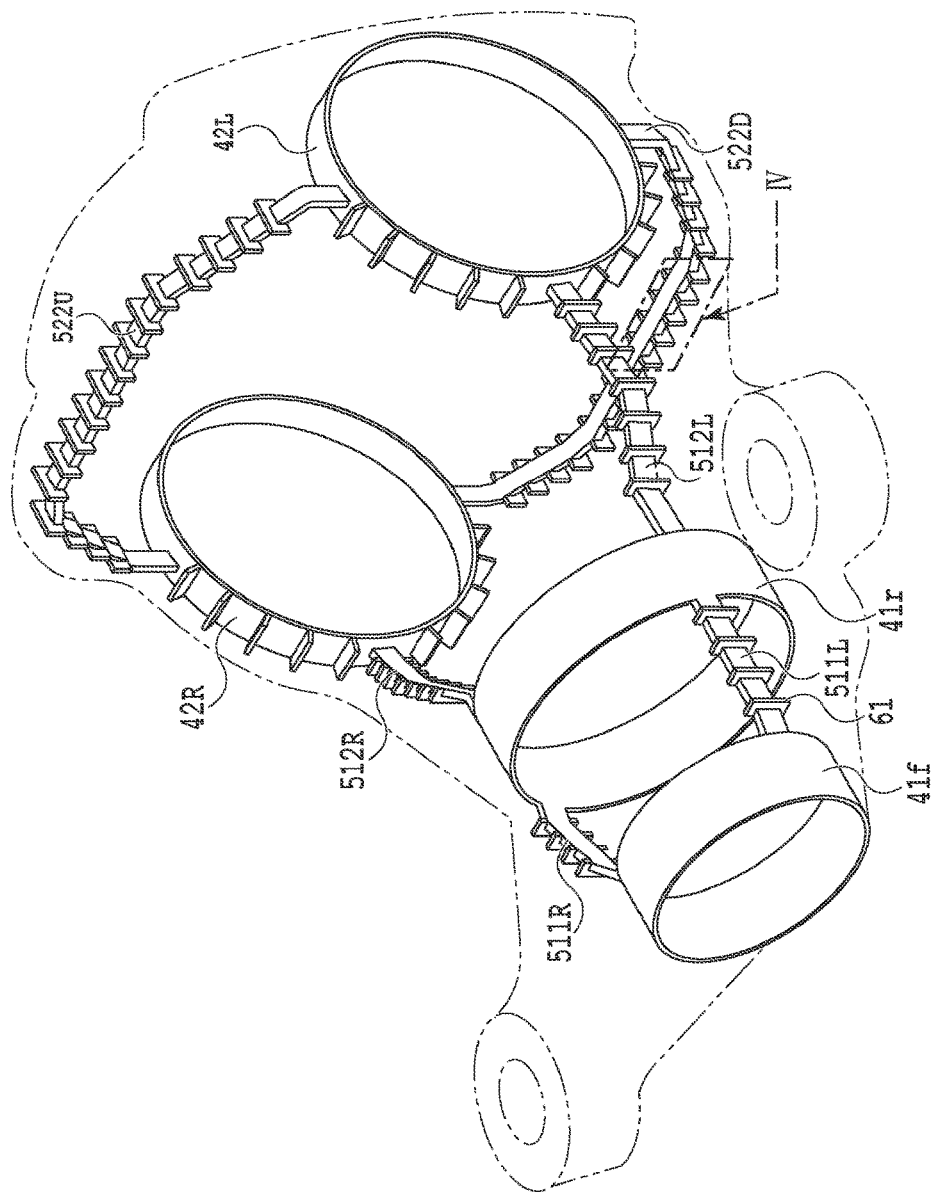
FIG. 3 is a perspective view illustrating bearing surrounding members and connecting members that connect the bearing surrounding members in the differential housing according to the embodiment.

FIG. 1 is a plan sectional view of a vehicular differential 1 that includes a differential housing 20 according to an embodiment of the disclosure, and FIG. 2 is a side sectional view thereof. FIG. 3 is a perspective view illustrating bearing surrounding members 41f, 41r, 42R, 42L and connecting members 511R, 511L, 512R, 512L, 522U, 522D that connect the bearing surrounding members in the differential housing 20 according to the embodiment. In FIG. 3, an outline of the differential housing 20 is simply represented by an alternate long and short dashes line for convenience of the description.

The differential 1 of the embodiment is used for rear-wheel drive in an FR vehicle, for example. Note that, in FIG. 1 and FIG. 2, a side indicated by a "front" arrow is a front side of the vehicle, a side indicated by a "right" arrow is a right side of the vehicle, and a side indicated by an "up" arrow is an upper side of the vehicle. In the disclosure, a position near a drive source in a power transmission path referred to as a "proximal" position, and a position far from the drive source is referred to as a "distal" position. In the differential 1 according to the embodiment, the front side of the vehicle is "proximal".

As shown in FIG. 1 and FIG. 2, the differential 1 includes the differential housing 20, a final reduction gear mechanism 31, a differential gear mechanism 32, and so on.

The differential housing 20 includes a differential carrier 21 and a carrier cover 22. Each of the differential carrier 21 and carrier cover 22 is made of an aluminum-based material for, for example, reducing the weight of the differential housing 20. The carrier cover 22 is fastened, with a bolt (not shown), at an opening portion at a rear end of the differential carrier 21.

The final reduction gear mechanism 31 includes a drive pinion shaft 13, a drive pinion gear 14, a front bearing 15f, a rear bearing 15r, a ring gear 18, and so on. In the disclosure, the front bearing 15f and the rear bearing 15r may be collectively referred to as an "input bearing". A pinion shaft chamber 23 is formed in a front portion (the front side with respect to the vehicle) of the differential carrier 21, and the front bearing 15f and the rear bearing 15r as rolling bearings are fitted in the pinion shaft chamber 23. The drive pinion shaft 13 is rotatably supported by the front bearing 15f and the rear bearing 15r. The rear bearing 15r is disposed to be more distal than the front bearing 15f (that is, the rear bearing 15r is farther from the drive source than the front bearing 15f is), and the rear bearing 15r supports the drive pinion shaft 13 at a position near the drive pinion gear 14. Each of the front bearing 15f, the rear bearing 15r, and differential case bearings 39R, 39L, which will be described below, includes an inner race, an outer race, and rolling elements (for example, two rows of balls in the rear bearing 15r) that roll therebetween. The rolling elements are held by a cage that is made of a resin. Note that, in the embodiment, an angular contact ball bearing (a single-row angular contact ball bearing, or a multi-row angular contact ball bearing) is used as each of the front bearing 15f and the rear bearing 15r for the purpose of reducing loss; however, each of the bearings may be a tapered roller bearing that is generally used in the differential, for example.

A flange 6 is fastened to one end (the front side with respect to the vehicle) of the drive pinion shaft 13 by a nut 5. An oil seal 17 is disposed between the flange 6 and the front bearing 15f. The flange 6 is connected to a rearmost end of a propeller shaft (not shown) by a bolt (not shown). The propeller shaft transmits power of an engine (not shown) as a drive source mounted on a front portion of the vehicle. The drive source may be a motor.

The drive pinion gear 14 is integrally formed at a distal end of the drive pinion shaft 13, that is, a shaft end on a side opposite to the flange 6, and the drive pinion gear 14 meshes with the ring gear 18. A speed of rotation of the drive pinion shaft 13 is reduced at a gear ratio between the drive pinion gear 14 and the ring gear 18, and the rotation whose speed has been reduced is transmitted to the ring gear 18.

The ring gear 18 is accommodated together with the differential gear mechanism 32 in a differential mechanism chamber 24 that is formed in a rear portion (a rear side with respect to the vehicle) in the inside of the differential carrier 21. The differential gear mechanism 32 includes a differential case 34, side gears 35R, 35L, differential pinions 36f, 36r, a differential pinion shaft 38, the differential case bearings 39R, 39L, and so on. The ring gear 18 is fixed to the differential case 34 with a bolt 33, and the ring gear 18 can thereby rotate integrally with the differential case 34.

The pair of right and left differential case bearings 39R, 39L as the rolling bearings is fitted to the differential case 34. The differential case 34 is rotatably supported by the differential case bearings 39R, 39L. In a hollow portion of the differential case 34, the differential pinion shaft 38 is supported in a direction orthogonal to an axis that serves as a center axis during rotation of the differential case 34. The pair of differential pinions 36f, 36r is provided. The differential pinions 36f, 36r are rotatably supported in end portions of the differential pinion shaft 38 such that the differential pinions 36f, 36r face each other. The pair of side gears 35R, 35L is provided. The side gears 35R, 35L are disposed in a right side and a left side of the hollow portion of the differential case 34, and mesh with the differential pinions 36f, 36r. Ends of right and left axles (not shown) are inserted through the differential case 34, and connected to the side gears 35R, 35L such that the right and left axles are rotatable together with the side gears 35R, 35L. Right and left wheels (not shown) are connected to the other ends of the right and left axles.

In the differential housing 20 according to the embodiment, the bearing surrounding member 41f is provided to surround the front bearing 15f, and the bearing surrounding member 41r is provided to surround the rear bearing 15r. In addition, the bearing surrounding member 42L is provided to surround the differential case bearing 39L, and the bearing surrounding member 42R is provided to surround the differential case bearing 39R. Each of the bearing surrounding members 41f, 41r, 42R, 42L is formed to have a tubular shape that extends over a whole circumference, and that completely surrounds the corresponding bearing.

As shown in FIG. 3, a left portion of a peripheral edge at a distal side of the bearing surrounding member 41f is connected to a left portion of a peripheral edge at a proximal side of the bearing surrounding member 41r by the connecting member 511L, and a right portion of the peripheral edge at the distal side of the bearing surrounding member 41f is connected to a right portion of the peripheral edge at the proximal side of the bearing surrounding member 41r by the connecting member 511R. In addition, an upper portion of an outer peripheral surface of the bearing surrounding member 42L is connected to an upper portion of an outer peripheral surface of the bearing surrounding member 42R by the connecting member 522U, and a lower portion of the outer peripheral surface of the bearing surrounding member 42L is connected to a lower portion of the outer peripheral surface of the bearing surrounding member 42R by the connecting member 522D. Furthermore, a left portion of a peripheral edge at a distal side of the bearing surrounding member 41r is connected to a proximal portion of the outer peripheral surface of the bearing surrounding member 42L by the connecting member 512L, and a right portion of the peripheral edge at the distal side of the bearing surrounding member 41r is connected to the proximal portion of the outer peripheral surface of the bearing surrounding member 42R by the connecting member 512R. Note that, in the disclosure, the bearing surrounding member 41f may be connected to each of the bearing surrounding members 42R, 42L by a connecting member.

Figure 4:
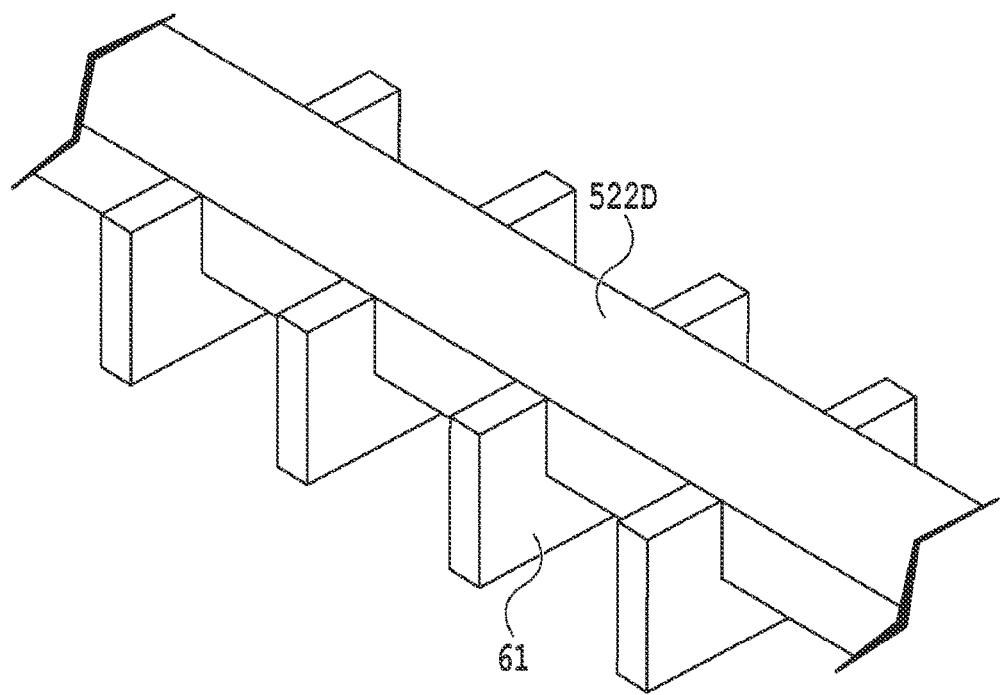
FIG. 4 is an enlarged view of a portion IV in FIG. 3.

FIG. 4 is an enlarged view of a portion IV in FIG. 3. Each of the connecting members 511R, 511L, 512R, 512L, 522U, 522D includes at least one projection 61 that projects in a direction crossing a longitudinal direction of the connecting member. Each projection 61 is projected to an outer side of the differential housing 20. The bearing surrounding members 41f, 41r, 42R, 42L, the connecting members 511R, 511L, 512R, 512L, 522U, 522D, and the projections 61 are each constructed of a material (for example, iron) having a smaller linear expansion coefficient than that of a base material of the differential housing 20, and they are connected by welding, for example.

The bearing surrounding members 41f, 41r, 42R, 42L, the connecting members 511R, 511L, 512R, 512L, 522U, 522D that connect the bearing surrounding members, and the projections 61 constitute a single frame body, and the frame body functions as a framework of the differential housing 20. In the embodiment, at least a part of each of the connecting members is embedded in a wall that is made of the base material of the differential housing 20. That is, the connecting member that connects the bearing surrounding members is embedded in at least one wall in at least one region among walls in regions between the bearing surrounding members in the differential housing. Here, the phrase "at least a part of the connecting member is embedded" indicates that a whole periphery of the connecting member is in contact with the base material in a cross section that crosses the longitudinal direction of the connecting member. The meaning of the phrase "at least a part of the connecting member is embedded" includes a case where an entire surface of the connecting member is in contact with the base material, and a case where a part of the connecting member is exposed to an outside of the base material in another cross section that crosses the longitudinal direction of the connecting member. The differential housing 20 is formed by inserting the frame body in the base material (for example, aluminum) of the differential housing 20 by insert casting. That is, the differential housing 20 is formed by placing the frame body in a mold, and then, pouring a molten material into the mold and solidifying it.

In the differential 1 that is configured as described above, a speed of rotation of the engine (not shown) is changed by a transmission (not shown), and the rotation whose speed has been changed is transmitted to the drive pinion shaft 13 through the propeller shaft (not shown). When the drive pinion gear 14 on the drive pinion shaft 13 rotates, the ring gear 18 and the differential case 34 are rotated together. The ring gear 18 meshes with the drive pinion gear 14. The ring gear 18 is fixed to the differential case 34. Due to the rotation of the differential case 34, the side gears 35R, 35L, the differential pinions 36f, 36r, and the differential pinion shaft 38 in the hollow portion of the differential case 34, and the right and left axles (not shown), which are inserted through the differential case 34, are rotated. Then, due to the rotation of the axles, the right and left wheels (not shown) are driven to cause differential rotation.

As described above, the differential housing 20 is made of the aluminum-based material. The main members of the differential 1 other than the differential housing 20, particularly, the final reduction gear mechanism 31 and the differential gear mechanism 32 are each constructed of iron. Because a linear expansion coefficient of the aluminum-based material is significantly larger than that of iron, a dimensional change due to a temperature change, that is, thermal expansion/contraction may cause a problem in the differential 1. For example, when a positional relationship between the ring gear 18, which is fixed to the differential gear mechanism 32, and the drive pinion gear 14, which is disposed on the drive pinion shaft 13, is changed as a result of the thermal expansion/contraction of the differential housing 20, noise (groan sound noise or the like) and vibrations are likely to be generated in these gears. Thus, a power transmission state may fluctuate.

Thus, the differential housing 20 according to the embodiment includes the bearing surrounding members 41f, 41r, and the bearing surrounding members 42R, 42L. The bearing surrounding members 41f, 41r surround the front bearing 15f and the rear bearing 15r that hold the drive pinion shaft 13. The bearing surrounding members 42R, 42L surround the right and left differential case bearings 39R, 39L that hold the differential case 34. The bearing surrounding members are connected by the connecting members 511R, 511L, 512R, 512L, 522U, 522D. At least a part of each of the connecting members 511R, 511L, 512R, 512L, 522U, 522D is embedded in the wall that is formed of the base material of the differential housing 20. Furthermore, each of the bearing surrounding members 41f, 41r, 42R, 42L and the connecting members 511R, 511L, 512R, 512L, 522U, 522D is constructed of the material with the smaller linear expansion coefficient than that of the base material of the differential housing 20.

With the configurations, it is possible to suppress a change in a relative positional relationship among the front bearing 15f and the rear bearing 15r that hold the drive pinion shaft 13, and the right and left differential case bearings 39R, 39L that hold the differential case 34. Thus, a change in a relative positional relationship between the drive pinion gear 14 and the ring gear 18 is suppressed. As a result, it is possible to suppress a fluctuation of the power transmission state due to the thermal expansion/contraction of the differential housing 20. That is, because the connecting members, each of which has the small linear expansion coefficient, suppress the change in the relative positional relationship among the various bearings even during the temperature change, a teeth-contact state of the ring gear 18 and the drive pinion gear 14 is likely to be maintained. Thus, generation of the noise and the vibrations can be suppressed. Further, in the embodiment, at least a part of each of the connecting members 511R, 511L, 512R, 512L, 522U, 522D is embedded in the wall that is made of the base material of the differential housing 20. Thus, it is possible to suppress displacement of each of the connecting members with respect to the base material during the thermal expansion/contraction.

Furthermore, according to the embodiment, thermal stress generated due to the thermal expansion/contraction of the differential housing 20 is distributed and applied to attachment positions at which the projections 61 are attached. Thus, deformation of the connecting members 511R, 511L, 512R, 512L, 522U, 522D can be suppressed. Moreover, because the projection 61 functions to resist against (that is, hinder) the thermal expansion/contraction of the differential housing 20, the thermal expansion/contraction of the differential housing 20 can be suppressed. Thus, as compared to a configuration in which the projection 61 is not provided, it is possible to more effectively suppress the change in the power transmission state due to the thermal expansion/contraction of the differential housing 20. Because the thermal stress of the differential housing 20 is distributed and applied to the attachment positions at which the projections 61 are attached, the thickness and weight of each of the connecting members can be reduced. Thus, the cost and weight of a product can be reduced. Note that, although the plurality of projections 61 is formed in the embodiment, at least one projection 61 may be formed. The disclosure also includes a configuration in which the projection 61 is not provided in each of the connecting members 511R, 511L, 512R, 512L, 522U, 522D.

The disclosure is not limited to the above-described configurations and modified examples thereof. The disclosure includes various modified examples, application examples, and equivalent thereof that are included in the scope of the disclosure. Therefore, the disclosure should not be interpreted restrictively and thus can also be applied to any other techniques that belong to the scope of the disclosure. For example, a shape, the number, and a connecting state of the connecting member as well as a shape and the number of the bearing surrounding member are not limited to those in the above embodiment. Various configurations can be adopted as long as the effects of the disclosure can be obtained. For example, only some of the connecting members and the bearing surrounding members connected by some of the connecting members may be adopted.

What is claimed is:

1. A differential housing configured to support a plurality of bearings including a front bearing, a rear bearing and a pair of right and left differential case bearings, the front bearing and the rear bearing supporting a rotational shaft of an input gear meshing with a gear, the right and left differential case bearings supporting a differential case such that the differential case is rotatable, the gear meshing with the input gear being fixed to the differential case, the differential housing comprising:
   a first bearing surrounding member provided to surround a first bearing included in the plurality of bearings, the first bearin being one of the front bearing and the rear bearing or one of the right and left differential case bearings;
   a second bearing surrounding member provided to surround a second bearing included in the plurality of bearings, the second bearing being one of the front bearing and the rear bearing not selected as the first bearing or one of the right and left differential case bearings not selected as the first bearing; and
   a connecting member that connects the first bearing surrounding member and the second bearing surrounding member, at least a part of the connecting member being embedded in a wall that is made of a base material of the differential housing, wherein
   each of the first bearing surrounding member, the second bearing surrounding member, and the connecting member is constructed of a material having a smaller linear expansion coefficient than that of the base material of the differential housing.

2. The differential housing according to claim 1, wherein the connecting member includes at least one projection that projects in a direction crossing a longitudinal direction of the connecting member.

3. The differential housing according to claim 1, wherein the first bearing is the front bearing or the rear bearing, and the second bearing is at least one of the differential case bearings.

4. The differential housing according to claim 1, wherein the first bearing is the one of the right and left differential case bearings, and the second bearing is an other of the right and left differential case bearings.

5. The differential housing according to claim 1, wherein:
   the rear bearing is disposed to be more distal than the front bearing; and
   the first bearing is the front bearing, and the second bearing is the rear bearing.

6. The differential housing according to claim 1, wherein:
   the base material of the differential housing is aluminum; and
   each of the first bearing surrounding member, the second bearing surrounding member, and the connecting member is constructed of iron.

\* \* \* \* \*